United States Patent
Allirot et al.

[15] 3,697,576
[45] Oct. 10, 1972

[54] PURIFICATION OF NITRILES

[72] Inventors: Rene Joseph Allirot, Huningue; Claude Darcas; Raymond Jobert, both of St. Avold, Moselle, all of France

[73] Assignee: Ugine Kiuhlmann, Paris, France

[22] Filed: Dec. 24, 1969

[21] Appl. No.: 888,022

[52] U.S. Cl. ............260/465.3, 260/307, 260/465.9
[51] Int. Cl. ...................C07c 121/32, C07c 121/00
[58] Field of Search.......................260/465.3, 465.9

[56] References Cited

UNITED STATES PATENTS

| | | |
|---|---|---|
| 3,522,268 | 7/1970 | Hall et al. ............260/465.3 X |
| 3,524,875 | 8/1970 | Hadley et al............260/465.3 |
| 3,541,131 | 11/1970 | Darcas et al............260/465.3 |
| 3,445,347 | 5/1969 | Borrel et al.........260/465.3 X |
| 3,283,803 | 11/1966 | Phillips, Jr. et al ..............260/465.9 X |
| 3,262,966 | 7/1966 | Higgins, Jr. et al.....260/465.9 |
| 2,684,979 | 7/1954 | Wenner et al. ..........260/465.9 |
| 3,409,561 | 11/1968 | Ferlazzo et al......260/465.3 X |
| 3,426,060 | 2/1969 | Eden ......................260/465.3 |

*Primary Examiner*—Joseph P. Brust
*Attorney*—Brooks, Haidt & Haffner

[57] ABSTRACT

Procedure for the removal of nitrogenous bases such as oxazole from partially purified nitrile compositions obtained by vapor phase catalytic reaction between ethylenic hydrocarbons, ammonia and oxygen in which the nitrogenous base is removed by adsorption on alumina, decolorizing clays, or silica.

8 Claims, No Drawings

PURIFICATION OF NITRILES

BACKGROUND OF INVENTION

This invention relates to the recovery of nitrogen containing heterocyclic compounds such as oxazole and isoxazole from nitrile compositions which have been purified by standard method after production by catalytic reaction of ethylenic hydrocarbons with ammonia and oxygen in the vapor phase . . . the so-called ammoxidation reaction.

Nitriles, including acrylonitrile, may be produced by the vapor phase reaction of ethylenically unsaturated hydrocarbons such as propylene with ammonia and an oxygen containing gas such as air in the presence of known catalysts. The product as produced contains a variety of impurities and even after purification, for example by distillation, small quantities of these impurities may remain. The presence of these impurities has a deleterious effect on the quality of the products subsequently prepared from the nitriles. For example, certain of these impurities adversely affect the quality of polymers prepared from acrylonitrile. It is these nitrile compositions referred to herein as "partially purified nitrile compositions" with which this invention is principally concerned.

Various methods have been devised for the separation of these impurities by distillation, but the volatility of the impurities is often so close to that of the nitrile to be purified that separation by distillation is very complicated and costly. These problems are especially significant in the case of acrylonitrile which is an extremely important industrial chemical.

Heterocyclic compounds, especially those which are weakly basic due to the presence in the ring of at least one nitrogen atom, as in the azole group of oxazole or isoxazole, are amongst the harmful impurities which have been found in industrial reaction products of the above described class. These compounds, especially oxazole, are themselves industrially important as starting materials or intermediates in the production of various commercial products, especially pharmaceutically useful compounds.

A method of separating and recovering oxazole and related heterocyclic compounds of low basicity while avoiding the complications and cost of prior distillation procedures would be a significant advance in the art. Such a method has now been discovered.

THE INVENTION

It has now been discovered that weakly basic heterocyclic nitrogenous compounds of the character described above can be substantially eliminated from partially purified nitrile compositions produced by catalytic vapor phase reaction between ethylenic hydrocarbons, ammonia and oxygen by contacting the compositions with selected adsorbents. These adsorbents include thermally activated alumina, decolorizing clays or silica. The presently preferred processes of thermal activation vary with the selected adsorbent.

While other varieties of alumina, i.e. aluminum hydroxide or aluminum oxide can be employed, the presently preferred aluminas are hydrargillite, gibbsite and boehmite. These are preferred for reasons of economy and efficiency. For activation, the selected alumina is dehydrated while scavenging the alumina with a dry, inert gas such as air. This is accomplished by initially heating the alumina to a temperature of from about 275° C. to 350° C. starting from ambient temperature during a period of from about 40 to 80 minutes, preferably 55 to 65 minutes. The temperature is maintained at this level for from about 4 to 6 hours followed by rapid cooling. Scavenging is continued during all operations. The activated alumina should be kept out of contact with moisture until ready for use.

A preferred procedure for economy and efficiency is to heat the sample to 300° C. during a period of 60 minutes, to maintain it at this temperature for 5 hours and to then cool to ambient temperature in a dry atmosphere.

The presently preferred silica is prepared by treating a soluble alkali metal silicate such as sodium metasilicate with an aqueous acid such as concentrated hydrochloric acid to precipitate the silica as silica gel.

The precipitated silica gel is washed completely with water, dried, and particulated. Coarse grains, the largest cross-section of which is from about 0.1 to 2 mm, are satisfactory. The silica is heated for from about 9 to 12 hours at a temperature of from about 90° C. to 150° C. to produce an activated product suitable for use in this invention. Useful products may be prepared, for example, by heating for about 9.5 to 10.5, suitably 10 hours, at about 105° C. to 115° C., suitably 110° C. The activated products are cooled and screened to the desired size.

The decolorizing clays useful in this invention are, more specifically, hydrated aluminum silicates the composition of which may vary as some of the aluminum is replaced with magnesium or calcium. A number of such clays are known and may be activated for use in this invention. The presently preferred species are attapulgites, sepiolites and montmorillonites. A variety of such clays are available commercially, These include, for example, Clarsil PC 1, LE 2, LER 48, LC and PC available from Carbonisation et Charbons Actifs C.E.C.A.S.A.

These clays are activated by heating at a temperature of from about 200° C. to 350° C. during a period of from about 3 to 6 hours. Useful products may be prepared, for example, by heating at about 290° C. to 310° C., suitably 300° C. for from 4 to 5 hours.

The purification process may be continuous or batchwise. The nitrile composition may be contacted with the adsorbent by passage through a column or bed of the substance or by intimately mixing the product and adsorbent and then separating the adsorbent, for example, by filtration.

The activated adsorbents used in the invention may be employed for long periods of time depending, of course, on the amounts of adsorbable nitrogenous impurities in the compositions to be purified. The amount of such impurities which will be adsorbed depend, as in other adsorption procedures, on such factors as temperature, particle size and flow rate. The optimum balance for most economic operation can be readily determined by observation.

The process of the invention can be carried out over a wide range of temperatures, but since nitriles tend to be unstable at elevated temperatures it is preferred to operate at ambient temperatures or even lower. Temperatures from about 15° C. to 40° C. are suitable. Since adsorption is not normally an exothermic reaction this temperature range is generally within that range which would be recommended in accordance with the physical laws of absorption.

It is generally preferred to practice the invention with adsorbents of fine particle size in order to reach equilibrium more quickly.

For adsorption in a column, it is preferred to use a relatively slow rate of flow, although the rate should be greater than the speed of diffusion.

After the adsorbents have been employed to the state where they are no longer efficient they can be regenerated. The adsorbents are first washed with water. If they have been employed in a continuous manner they are washed with from 50 to 100 times their volume of water. It is preferred to utilize at least 80 times their volume. If they have been utilized in a batchwise operation, the preferred procedure is to wash with from about 50 to 80 volumes of water, operating with 10 volume increments. In either event the washed adsorbents are dried and reactivated following the original activation procedures described above.

The following examples illustrate the process of the invention as applied to the removal of oxazole from acrylonitrile which has been prepared by the vapor phase catalytic reaction between propylene, ammonia and air and contains 85 parts per million by weight of oxazole and 0.3 percent by weight of water. The presence of oxazole in the original compositions and in the purified products was determined by chromatography in the gaseous phase using an apparatus equipped with a very sensitive flame ionization detector and capable of detecting an oxazole content of the order of 0.5 parts per million.

The examples are merely illustrative of the invention which is applicable to the removal of oxazole and other azole group containing nitrogenous bases such as isoxazole from a variety of nitrile compositions prepared by the ammoxidation reaction utilizing ethylenic hydrocarbons other than propylene.

EXAMPLE 1

The installation used in a glass tube with an internal diameter of 10 mm and a height of 500 mm, containing the adsorbent.

A plug of glass wool placed in the base of the tube prevents the adsorbent from escaping from the tube. The product to be purified is pumped into the tube from a reservoir.

It is circulated through the adsorbent in a downward direction, but the direction of flow may also be reversed. At the top of the column a set of stopcocks makes it possible to isolate the column or to replace the feed of product to be purified by a feed of water.

In the lower part of the column there is also a set of stopcocks which makes it possible to direct the effluent product to receiver flasks, or to direct a stream of liquid (water or nitrile) in the upwards direction so as to release the adsorbent where necessary or so as to wash it prior to reactivation.

The upper and lower sets of stopcocks are removably connected to the glass tube which serves as an adsorption column. In this way it is possible to dismantle the adsorption column and to place it in a cylindrical electric furnace for activation of the adsorbent. For the purpose of scavenging with air, one of the ends of the adsorption column is connected to a compressed air pipe via a ground glass connection and a regulating valve.

Alumina prepared as stated above and having a particle size of 200–500µ, with an apparent density of 0.7 is used as an adsorbent. A total of 17 g. of alumina is utilized to fill the tube. The adsorption column is then placed in the electric furnace, and while scavenging with a stream of air totalling approximately 10 liters at a rate of a few liters per hour, the temperature of the furnace is increased to 300° C. in one hour. The temperature and the flow of air are maintained for 6 hours. The tube is then cooled and it is fitted to the three-way stopcocks mentioned above by means of the ground glass unions.

The product to be purified is the acrylonitrile defined above containing 85 ppm of oxazole. The rate of flow of the pump is regulated in such a way that approximately 500 mls of acrylonitrile flow through per hour. It is arranged so that the bed of alumina operates while flooded.

Each 10 ml fraction of acrylonitrile flowing out of the column is analyzed by gas phase chromatography as stated above, and a curve is plotted showing the content of oxazole in ppm in the effluent plotted against the volume of acrylonitrile which has passed through the adsorbent. Up to 245 mls it is not possible to detect any trace of oxazole in the effluent; at 255 mls approximately 10 ppm of oxazole is detected. The breakthrough figure for the alumina is therefore in the vicinity of 250 mls and this represents a retention of 1.0 g of oxazole per kg of alumina.

The operation is continued until the concentration of oxazole in the effluent acrylonitrile has reached the oxazole concentration of the in-flowing acrylonitrile, i.e. 85 ppm. This takes place at about 350 mls of acrylonitrile.

The alumina is then totally saturated with oxazole. The process is then stopped and the acrylonitrile is allowed to drain.

In industrial practice it will be seen that in this way it is possible to obtain 1 ton of oxazole-free acrylonitrile by treating 1 ton of acrylonitrile with 85 ppm of oxazole over 85 kg of alumina, which can be regenerated.

EXAMPLE 2

This example illustrates the regeneration of the alumina used in Example 1.

Water is circulated upwards through the adsorption column, at a rate of approximately 1.9 liters per hour for 1 hour.

The alumina is drained. The adsorption column is placed in the electric furnace mentioned in Example 1 and the adsorbent is heated to 300° C. while scavenging with air at about 10 liters per hours. The time required for the temperature to rise to this level is about 1 hour. The temperature is maintained at 300° C. for 5 hours. It is then cooled to purify another batch of acrylonitrile.

The reactivated product is utilized to repeat the process of Example 1, and the same results are obtained.

The same batch of alumina may be regenerated many times. This markedly decreases the consumption of alumina per ton of purified product.

EXAMPLE 3

To 1,000 mls of acrylonitrile containing 85 ppm of oxazole there are added 40 g of Clarsil PC 1. This adsorbent is a decolorizing earth in powder form sold by Carbonization et charbons actifs C.E.C.A. SA. This Clarsil PC 1 was previously activated by heating for 5 hours at 300° C.

The suspension is agitated at ambient temperature for 15 minutes, and filtered. The filtrate is analyzed and it is found that the acrylonitrile thus treated contains no more than 34 ppm of oxazole. This means that 60 percent of the oxazole contained originally in the acrylonitrile has been eliminated.

The solid retained on the filter is washed with 50 mls of water in several fractions.

The solid is dried and placed in a furnace through which air is circulated. After 5 hours at 300° C. it is cooled and it is found by treating again a sample of acrylonitrile containing oxazole that the initial purification efficiency has been regained.

EXAMPLE 4

Example 3 is repeated making use of different decolorizing earths on the basis of 5 parts by weight of decolorizing earth per 100 parts by weight of acrylonitrile and agitating for 15 minutes at ordinary temperature.

The results obtained are shown in the table below.

The purification efficiency, R, is understood to mean
R = (initial concentration of oxazole − final concentration)/(initial concentration) × 100

|  | R |
|---|---|
| CLARSIL LE 2 | 50 % |
| CLARSIL LER 49 | 62 |
| CLARSIL LC | 54 |
| CLARSIL PC | 60 |
| CLARSIL PCS | 12 |

All these decolorizing earths were washed with water after use and then reactivated as described in Example 3. After reactivation the initial properties were found to be regenerated.

EXAMPLE 5

A total of 200 mls of sodium silicate containing 500 g per liter, to which 1,500 mls of water had been added, were treated with concentrated hydrochloric acid so as to give an acid medium. The silica which precipitates is filtered and washed with water until the washings have a pH of 6.5–7.

The silica gel is then dried in an oven at 110° C. overnight. It is ground, and the fraction with a particle size of between 0.210 mm and 0.420 mm is retained by screening.

8.726 g of activated silica as obtained above are placed in the apparatus described in Example 1.

Acrylonitrile containing 85 ppm of oxazole is percolated through and each 25 ml fraction of effluent is analyzed.

After 225 mls have percolated through at a rate of 250 mls per hour, the same concentration of oxazole is observed in the effluent as in the feed acrylonitrile.

A total of 0.45 g of oxazole was retained per kg of silica gel.

The silica gel is washed with 50 mls of water. It is then dried and heated at 110° C. for 10 hours to regenerate its initial properties.

What is claimed is:

1. A process for the removal of at least one of oxazole or isoxazole weakly basic heterocyclic nitrogenous compound impurities from acrylonitrile produced by ammoxidation of propylene and containing said impurities in small quantities, by contacting at temperatures not above about 40° C partially purified acrylonitrile containing not more than about 0.3 percent by weight of water with an adsorbent which is alumina, hydrated aluminum silicate, silica, or mixtures thereof, said adsorbent being thermally activated by heating at a temperature of at least about 90° C, to adsorb the nitrogenous compound on the activated adsorbent, and recovering the acrylonitrile after contact with the adsorbent.

2. A process as in claim 1 wherein the adsorbent is alumina which has been activated by initially heating to a temperature of from about 275° C. to 350° C. during a period of about 40 to 80 minutes and maintaining the alumina at this temperature for a period of from about 4 to 6 hours and thereafter rapidly cooling while scavenging the alumina with a dry, inert gas during all operations.

3. A process as in claim 2 wherein the alumina is hydrargillite, gibbsite or boehmite.

4. A process as in claim 1 wherein the adsorbent is silica which has been activated by heating at from about 90° C. to 150° C. for from about 9 to 12 hours, 5. A process as in claim 1 wherein the adsorbent is the hydrated aluminum silicate which has been activated by heating at from about 200° C. to 350° C. for from about 3 to 6 hours.

6. A process as in claim 5 wherein the hydrated aluminum silicate is attapulgite, sepiolite or montmorillonite.

7. A process as in claim 1 wherein the adsorbent is contacted with the partially purified nitrile at temperatures of from about 15° C. to 40° C.

8. A process as in claim 1 wherein the adsorbent is regenerated by washing with water and thermally reactivated.

* * * * *